US005247865A

United States Patent [19]

Kröger et al.

[11] Patent Number: 5,247,865

[45] Date of Patent: Sep. 28, 1993

[54] APPARATUS FOR SUBDIVIDING RUNNING PAPER WEBS INTO NARROWER WEBS

[75] Inventors: Holger Kröger; Dieter Stolley, both of Norderstedt, Fed. Rep. of Germany

[73] Assignee: E. C. H. Will GmbH, Hamburg, Fed. Rep. of Germany

[21] Appl. No.: 949,422

[22] Filed: Sep. 22, 1992

[30] Foreign Application Priority Data

Nov. 6, 1991 [DE] Fed. Rep. of Germany ....... 4136506

[51] Int. Cl.[5] ......................... B23D 19/04; B26D 5/04

[52] U.S. Cl. ......................................... 83/482; 83/497; 83/503; 83/504

[58] Field of Search ................. 83/482, 497, 499, 503, 83/504, 502, 588

[56] References Cited

U.S. PATENT DOCUMENTS

| | | | |
|---|---|---|---|
| 3,892,156 | 7/1975 | Johnstone | 83/482 X |
| 4,201,102 | 5/1980 | Rudszinat | 83/298 |
| 4,257,299 | 3/1981 | Aykut | 83/482 |
| 4,434,695 | 3/1984 | Wingen | 83/482 |
| 4,876,933 | 10/1989 | Tahara | 83/482 |
| 5,072,638 | 12/1991 | Hüser | 83/24 |

*Primary Examiner*—Eugenia Jones
*Attorney, Agent, or Firm*—Peter K. Kontler

[57] ABSTRACT

Apparatus for subdividing a running web into narrower webs has a counterknife which is driven to rotate about a substantially horizontal axis. A second knife is freely rotatably mounted in a holder at a level above the counterknife. The holder is carried by the lower end of a vertically movable and turnable rod-like guide which can be moved up and down by a single-acting fluid-operated motor in cooperation with two springs or sets of springs. When the guide reaches its lower end position, the motor causes a conical end face at the lower end of a split sleeve to engage a complementary conical face at the upper end of a fixed guide member for the guide, whereby the sleeve clampingly engages the guide and locks it to the stationary cylinder of the motor so that the second knife is fixedly held at the selected level for any desired interval of time. An adjusting mechanism employing one or more fluid-operated motors is installed at the lower end of the guide and is actuatable to move the second knife and its holder in parallelism with the axis of rotation of the counterknife.

17 Claims, 1 Drawing Sheet

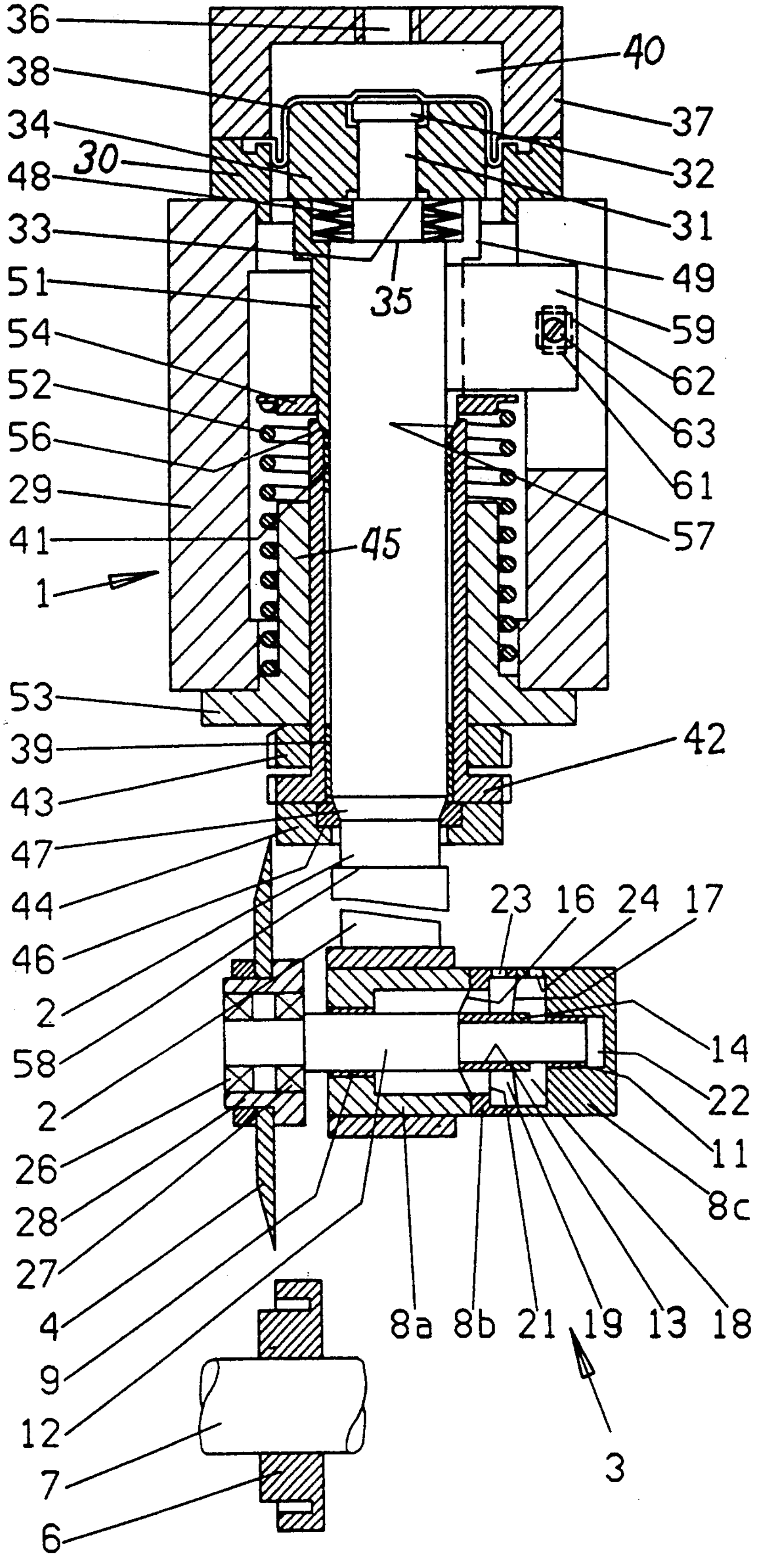
36
38
34
30
48
33
51
54
52
56
29
41
1
53
39
43
47
44
46
2
58
2
26
28
27
4
9
12
7
6
40
37
32
31
49
35
59
62
63
61
57
45
42
23
16
24
17
14
22
11
8c
18
13
19
21
8b
8a
3

APPARATUS FOR SUBDIVIDING RUNNING PAPER WEBS INTO NARROWER WEBS

BACKGROUND OF THE INVENTION

The invention relates to improvements in apparatus for severing running webs of paper, foil or like flexible materials, and more particularly to improvements in apparatus which can be utilized with advantage to subdivide running webs of flexible material into narrower webs or strips. Still more particularly, the invention relates to improvements in apparatus of the type disclosed in commonly owned U.S. Pat. No. 4,257,299 granted Mar. 24, 1981 to Kurt Aykut for "Means for moving a rotary knife in apparatus for cutting paper sheets or the like".

The apparatus which is disclosed in the patent to Aykut employs an upright rod-like guide which carries a holder for a first rotary knife. A driven second rotary knife is installed at a level beneath the first knife, and the first knife and its holder are movable with reference to the guide in parallelism with the axis of the second knife. Such adjustability of the first knife relative to the second knife renders it possible to select the extent of overlap between the two knives as well as the distance between the planes of the cutting edges of the knives.

A drawback of presently known apparatus of the above outlined character is that unavoidable clearances and/or clearances which develop as a result of progressing wear unduly affect the accuracy of positioning of the knives relative to each other. Vibrations of the knives in actual use of heretofore known apparatus also contribute to changes in orientation and can affect the quality of the cutting action and the useful life of the knives as well as the life expectancy of the entire severing apparatus. For example, vibrations can cause a change of orientation of the first knife relative to the second knife, and such change of orientation becomes more pronounced in response to progressing wear upon the means for holding, moving and adjusting the first knife.

OBJECTS OF THE INVENTION

An object of the invention is to provide a novel and improved apparatus wherein the wear upon the moving parts and/or other parts is less likely to affect the positioning of the knives relative to each other than in conventional apparatus.

Another object of the invention is to provide an apparatus which constitutes an improvement over and a further development of the apparatus described and shown in the patent to Aykut.

A further object of the invention is to provide an apparatus which automatically compensates for wear upon its parts.

An additional object of the invention is to provide a novel and improved mounting for one of the knives in the above outlined apparatus.

Still another object of the invention is to provide a machine for processing webs of paper or the like wherein the web or webs are subdivided into smaller parts by resorting to one or more apparatus of the above outlined character.

A further object of the invention is to provide a novel and improved method of automatically compensating for wear upon the parts of the above outlined apparatus.

SUMMARY OF THE INVENTION

The invention resides in the provision of an apparatus for subdividing a running first web of paper, foil or other flexible material into a plurality of narrower second webs. The improved apparatus comprises a first knife, a second knife, means for moving the second knife toward and away from the first knife including an elongated guide (e.g., a cylindrical tube or rod) which is movable longitudinally toward and away from the first knife between a plurality of different positions and a holder which is provided on the guide and carries the second knife, and means for releasably clamping the guide in a selected position relative to the first knife. The longitudinal axis of the preferably cylindrical guide is preferably vertical or nearly vertical, and the guide is movable in the direction of such axis to assume a selected position relative to the first knife. The guide is also rotatable about the vertical axis between a plurality of angular positions, and such apparatus further comprises means for releasably maintaining the guide in a selected angular position.

The clamping means can include means for form-lockingly arresting and maintaining the guide in one of the aforementioned different positions.

The first knife is preferably rotatable about a second axis which is or can be normal to the axis of the guide, and the second knife is or can be located at a level above the first knife. A motor-driven shaft or other suitable means can be provided to rotate the first knife about the second axis. The apparatus can further comprise means for adjusting the holder and the second knife relative to the guide in the direction of the second axis.

The apparatus can also comprise means for selecting the angular position of the guide in order to thus select the orientation of the second knife relative to the first knife.

In accordance with a presently preferred embodiment of the invention, the clamping means comprises a radially expandible and contractible sleeve which surrounds the guide; such sleeve can be provided with a slot which is at least substantially parallel to the axis of the guide. The sleeve is shiftable along the guide in the direction of the vertical axis and includes a conical end face. Such clamping means further comprises a second conical face which is at least substantially complementary to and is engageable by the end face. To this end, the second conical face is located in the path of movement of the sleeve relative to and/or with the guide to contract the sleeve around and against the guide upon engagement by the end face of the sleeve. The just described clamping means can further comprise a normally stationary sleeve-like guide member for the elongated guide, and the second conical face is then provided on such guide member. The latter preferably surrounds the guide beneath the sleeve, and the apparatus can further comprise friction reducing means (e.g., one or more friction bearings) between the guide and the guide member.

The just described presently preferred embodiment of the improved apparatus can further comprise means for shifting the sleeve relative to the guide member, and such shifting means can comprise fluid-operated means for displacing the sleeve in one of two directions including a first direction toward and a second direction away from the second conical face, and means for biasing the sleeve in the other of the two directions. The fluid-operated means can comprise a cylinder and a diaphragm piston which is installed in the cylinder and is operatively connected with the sleeve. The biasing means can comprise a first resilient element which reacts against the guide and bears against the piston of the fluid-operated means, and a second resilient element which reacts against a support and bears against the sleeve. The first resilient element can react against an external shoulder of the guide. The arrangement can be such that the first resilient element bears against the piston with a first force and that the second resilient element bears against the sleeve with a weaker second force. One of these resilient elements can comprise one or more dished springs, and the other resilient element can comprise one or more coil springs.

The guide can include an abutment (e.g., in the form of a frustoconical external shoulder at a level below the sleeve), and the apparatus can further comprise a stop (e.g., in the form of a ring-shaped seat) which is engageable by the abutment in response to movement of the guide toward the first knife. The stop is located at a fixed distance from the second conical face. The second conical face and the stop are preferably adjustable, e.g., as a unit, in the direction of the substantially vertical axis.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

The single FIGURE of the drawings is a fragmentary vertical sectional view of an apparatus which embodies one form of the present invention, the guide for the holder of the second knife being partly broken away and the second knife being shown close to its lower end position.

DESCRIPTION OF PREFERRED EMBODIMENTS

The apparatus which is shown in the drawings comprises a housing or casing 1 for a vertically and angularly movable elongated rod-shaped guide 2. The housing 1 can be installed in a paper processing machine, e.g., in a machine of the type disclosed in commonly owned U.S. Pat. No. 5,072,638 granted Dec. 17, 1991 to Peter Huser for "Apparatus for severing and dedusting webs of paper or the like". The narrower webs which are obtained by severing a wider web in the apparatus of the present invention can be introduced into cross cutters of the type disclosed in U.S. Pat. No. 4,201,102 granted May 6, 1980 to Willy Rudszinat for "Apparatus for subdividing running webs into sections of varying length". The disclosures of all of the aforeenumerated patents are incorporated herein by reference.

The lower end portion of the guide 2 supports an adjusting mechanism 3 for a knife holder 28 at a level above a first rotary knife 6. The means for driving the knife 6 about a substantially horizontal axis includes a shaft 7 receiving torque from a suitable motor or another prime mover, not shown. The holder 28 is rotatably mounted on antifriction bearings 26, 27 and carries a disc-shaped second rotary knife 4 which cooperates with the knife 6 to sever a web (not shown) of paper or the like while the web is caused to advance in a direction at right angles to the plane of the drawing.

The adjusting mechanism 3 serves to move the holder 28 and the knife 4 in parallelism with the common axis of the knife 6 and shaft 7, and includes three separable sections 8*a*, 8*b* and 8*c*. The sections 8*a* and 8*c* respectively contain sleeves 9 and 11 which surround an axially reciprocable shaft 12 for the holder 28. The antifriction bearings 26, 27 are installed between the left-hand end portion of the shaft 12 and the holder 28. The shaft 12 is further surrounded by two clamping or pinching cylinders 13, 14 serving to clamp the radially innermost portions of two flexible diaphragms 16 and 17. These radially innermost portions of the diaphragms are clamped to the shaft 12; the radially outermost portion of the diaphragm 16 is sealingly held between the sections 8*a*, 8*b*; and the radially outermost portion of the diaphragm 17 is sealingly held between the sections 8*b* and 8*c*. The diaphragm 17 constitutes a partition between two cylinder chambers 18, 19 and can be said to constitute a piston which is capable of moving the shaft 12 and the holder 28 with the knife 4 in parallelism with the common axis of the knife 6 and shaft 7. The diaphragm 16 seals the chamber 19 from the sleeve 9. The effective cross-sectional area of the diaphragm 16 is smaller than that of the diaphragm 17 because the outer diameter of the exposed portion of the diaphragm 16 is smaller. The reason is that the inner diameters of those parts of the sections 8*a*, 8*b* which clamp the radially outermost portion of the diaphragm 16 are smaller than the inner diameters of those parts of the sections 8*b*, 8*c* which clamp the radially outermost portion of the diaphragm 17. This is due to the provision of an internal shoulder 21 in the section 8*b* between the diaphragms 16 and 17. The chamber 19 is sealed by the diaphragms 16 and 17. The chamber 18 is sealed by the diaphragm 17 and by the section 8*c*; sealing of the chamber 18 from the sleeve 11 is not necessary because the latter is fully confined in a blind bore or socket 22 of the section 8*c*. The shaft 12 is provided with one or more channels (not specifically shown) which establish one or more paths for the flow of a fluid between the chamber 18 and the socket or blind bore 22. The chamber 19 can receive and discharge a fluid medium through a port 23 which is provided in the section 8*b*, and the chamber 18 can receive and discharge a fluid medium through a port 24 which is provided in the section 8*c*. The just described adjusting mechanism is analogous to that which is described and shown in the patent to Aykut.

The housing 1 includes a cylinder 29 forming part of a fluid-operated unit which serves to move the guide 2 axially between a plurality of different positions, namely between a plurality of positions at different distances from the knife 6. A diaphragm piston including a membrane 38 and a pusher or head 34 is provided in the cylinder 29 and is operatively connected with the upper end portion of the guide 2. The head 34 is axially movably mounted on a portion 31 of the guide 2 between a collar 32 at the upper end of the guide and a ring-shaped shoulder 33 which is provided on the guide at a level below the collar 32. The latter can constitute a separately produced part of the guide 2. The central portion of the membrane 38 overlies the head 34, and the marginal portion of this membrane is clamped between a detachable cap 37 and an intermediate portion 30 of the cylinder 29. The top wall of the cap 37 is provided with a port 36 for admission and evacuation of a suitable fluid, e.g., air. The cylinder 29 and the piston including the membrane 38 and head 34 constitute a single-acting fluid-operated motor or unit which serves to move the guide 2 axially downwardly in response to admission of pressurized fluid into the cylinder chamber 40 above the membrane 38.

The guide 2 is reciprocably and turnably mounted in two hollow cylindrical sleeve-like friction bearings 39 and 41 which, in turn, are mounted in a normally stationary sleeve-like guide member 42 which is threadedly connected to an insert or support 45 having a flange 53 which is bolted or otherwise secured to the cylinder 29 of the housing 1. A lock nut 43 is provided to normally maintain the insert 45 and the guide member 42 in selected axial positions.

The guide 2 has a frustoconical external abutment 47 which cooperates with a ring-shaped stop or seat 46 to determine the lower end position of the guide 2, adjusting mechanism 3, holder 28 and knife 4. An annular retainer 44 is provided to maintain the stop 46 in abutment with the underside of a flange at the lower end of the guide member 42.

The fluid which is admitted into the cylinder chamber 40 through the port 36 in the cap 37 must overcome the combined bias of two resilient elements 48 and 52 in order to move the guide 2 in a direction toward the knife 6. The upper resilient element 48 comprises a package of dished springs which are installed in stressed condition between the underside of the head 34 and an external shoulder 35 of the guide 2. The lower resilient element 52 comprises a coil spring which reacts against the flange 53 of the insert 45 and bears against a retainer 54 at the exterior of a radially expandible and contractible sleeve 51. The latter surrounds the guide 2 between the guide member 42 and the head 38 of the diaphragm piston in the cylinder 29. The illustrated sleeve 51 has an axially parallel slot 49 and its upper end face abuts the head 34 under the action of the coil spring 52. The bias of the spring 52 is weaker than the bias of the package of dished springs which constitute the resilient element 48. The coil spring 52 is stressed to a rather small extent when the head 34 is free to assume its upper end position.

In accordance with a feature of the present invention, the lower end face 56 of the sleeve 51 is a conical frustum which is surrounded by a second conical face 57 provided at the upper end of the guide member 42. The conical face 57 of the guide member 42 is located at a predetermined distance from the conical surface of the stop 46 beneath the flange at the lower end of the guide member 42. When the abutment 47 of the guide 2 engages the conical surface of the stop 46, the guide 2 maintains the knife 4 in the lower end position. The upper end position of the guide 2 (and hence of the knife 4) is determined by an external annular shoulder 58 which is provided on the guide 2 above the adjusting mechanism 3 and can move into abutment with the underside of the ring-shaped retainer 44 under the action of the resilient elements 48, 52 when the port 36 is free to discharge gaseous fluid from the cylinder chamber 40.

The distance of the stop 46 from the knife 6 and from the cylinder 29 (housing 1) can be adjusted by rotating the externally threaded guide member 42 relative to the internally threaded insert 45.

The means for selecting the angular position of the guide 2 (and hence the orientation of the knife 4 relative to the knife 6) includes a relatively short rail 59 which is installed in and extends radially outwardly from the guide 2 through the slot 49 of the sleeve 51. This rail is flanked by two rollers 61 one of which is biased by a spring, not shown. The other roller 61 is mounted in a carrier 62 which is movable at right angles to the plane of the drawing in response to rotation of a screw 63. Reference may be had again to the disclosure and drawing in the patent to Aykut.

The mode of operation is as follows:

The controls for the two fluid-operated motors or units of the improved apparatus are or can be constructed in a manner as disclosed in the patent to Aykut. The controls admit compressed gaseous fluid into the chamber 40 of the cylinder 29 so that the admitted fluid acts upon the membrane 38 which causes the guide 2 to move downwardly toward the knife 6. The downward movement of the guide 2 is terminated when its external abutment 47 engages the ring-shaped stop 46. At such time, the knife 4 partly overlaps the knife 6. The sleeve 51 shares the downward movement of the head 34 because it is in permanent contact therewith, and the retainer 54 of this sleeve causes the coil spring 52 to store energy. The conical end face 56 at the lower end of the sleeve 51 engages and slides along the complementary conical face 57 of the guide member 42 so that the sleeve 51 is compelled to contract and to force-lockingly engage the adjacent portion of the external surface of the guide 2. The relatively small clearance for axial compression and expansion of the resilient element 48 between the cap 32 and the shoulder 33 of the guide 2 suffices to ensure that the resilient element 48 stores a substantial amount of energy when the sleeve 51 is in requisite clamping engagement with the external surface of the guide 2. At the same time, the conical end face 56 is caused to bear against the conical face 57 of the guide member 42. This establishes a rigid connection between the guide 2 and the housing 1, and such connection remains intact for a practically unlimited period of time so that the level of the knife 4 relative to the knife 6 remains unchanged. Eventual play between the guide member 42 and the friction bearings 39, 41 on the one hand, and the guide 2 on the other hand, is of no consequence because the guide 2 is firmly gripped by the radially expansible and contactible sleeve 51 which is maintained in a fixed position relative to the housing 1 and its cylinder 29. The axial position of the guide 2 (and hence the distance of the axis of the knife 4 from the knife 6) remains unchanged while the apparatus is in the process of subdividing a running web into narrower webs or strips, i.e., while the knife 4 is under load and tends to move upwardly and away from the knife 6.

When the knife 4 reaches its selected lower end position (depending on the selected distance of the ring-shaped stop 46 from the conical face 57 of the guide member 42), the controls of the apparatus are caused to actuate the adjusting mechanism 3 which moves the knife 4 axially toward the knife 6 in a manner as disclosed in the patent to Aykut. Thus, compressed air or another suitable fluid medium is admitted into the chamber 19 through the port 23 so that the diaphragm 17 moves the shaft 12 in a direction to the right, i.e., the knife 4 is caused to move axially toward the knife 6. At the same time, the port 24 is free to discharge a gaseous or other suitable fluid from the chamber 18.

The radial dimensions of the friction bearings 39, 41 between the guide 2 and the guide member 42 are selected in such a way that the conical end face 56 of the sleeve 51 automatically engages and is moved radially inwardly by the conical face 57 in response to downward movement of the guide 2 under the action of pressurized fluid in the cylinder chamber 40 above the membrane 38.

An important advantage of the improved apparatus is its simplicity. In addition, the apparatus is reliable and ensures long-lasting retention of the knife 4 at an optimum level above the level of the knife 6. The exact level of the knife 4 in the lower end position of the guide 2 can be varied by varying the distance of the stop 46 from the conical face 57 of the guide member 42. The aforedescribed design including the clamping means 51, 42 eliminates any and all play which could result in a change of the level of the knife 4 relative to that of the knife 6. This enhances the severing operation of the knives 4, 6 and renders them less prone to vibrate in actual use of the severing apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for subdividing a running first web into a plurality of narrower second webs, comprising a first knife; a second knife; means for moving said second knife toward and away from said first knife including an elongated guide having a substantially vertical axis and being movable longitudinally in the direction of said axis toward and away from said first knife between a plurality of different positions and a holder provided on said guide and carrying said second knife, said guide being rotatable about said axis between a plurality of angular positions; means for releasably clamping said guide in a selected position relative to said first knife; means for releasably maintaining said guide in a selected angular position and means for selecting the angular position of said guide to thus select the orientation of said second knife relative to said first knife, said clamping means including a radially expandible and contractible sleeve which surrounds said guide to form-lockingly arrest said guide in one of said different positions, said sleeve having a slot which is at least substantially parallel to said axis, said selecting means extending through said slot in said sleeve.

2. The apparatus of claim 1, wherein said first knife is rotatable about a second axis and said second knife is located above said first knife.

3. The apparatus of claim 2, wherein said second axis is substantially normal to the axis of said guide, and further comprising means for rotating said first knife about said second axis.

4. The apparatus of claim 2, further comprising means for adjusting said holder and said second knife relative to said guide in the direction of said second axis.

5. The apparatus of claim 1, wherein said sleeve is shiftable in the direction of said axis and includes a conical end face, said clamping means further comprising a second conical face substantially complementary to and engageable by said end face and located in the path of movement of said sleeve to contract said sleeve around and against said guide upon engagement by said end face.

6. The apparatus of claim 5, wherein said clamping means further comprises a sleeve-like guide member for said elongated guide, said second conical face being provided on said guide member.

7. The apparatus of claim 6, wherein said guide member surrounds said guide beneath said sleeve and further comprising friction reducing means between said guide member and said guide.

8. The apparatus of claim 7, wherein said friction reducing means comprises at least one friction bearing.

9. The apparatus of claim 5, further comprising means for shifting said sleeve relative to said guide.

10. The apparatus of claim 9, wherein said shifting means comprises fluid-operated means for displacing said sleeve in one of two directions including a first direction toward and a second direction away from said second conical face, and means for biasing said sleeve in the other of said first and second directions.

11. The apparatus of claim 10, wherein said fluid-operated means comprises a cylinder and a diaphragm piston installed in said cylinder and operatively connected with said guide.

12. The apparatus of claim 5, wherein said guide includes an abutment and further comprising a stop engageable by said abutment in response to movement of said guide toward said first knife and located at a fixed distance from said second conical face.

13. The apparatus of claim 12, wherein said second conical face and said stop are adjustable in the direction of said substantially vertical axis.

14. Apparatus for subdividing a running first web into a plurality of narrower second webs, comprising a first knife; a second knife; means for moving said second knife toward and away from said first knife including an elongated guide having a substantially vertical axis and being movable longitudinally in the direction of said axis toward and away from said first knife between a plurality of different positions and a holder provided on said guide and carrying said second knife, said guide being rotatable about said axis between a plurality of angular positions; means for releasably clamping said guide in a selected position relative to said first knife; means for releasably maintaining said guide in a selected angular position, said clamping means including a radially expandible and contractible sleeve which surrounds said guide to form-lockingly arrest said guide in one of said different positions, said sleeve being shiftable in the direction of said axis and including a conical end face, said clamping means further comprising a second conical face substantially complementary to and engageable by said end face and located in the path of movement of said sleeve to contract said sleeve around and against said guide upon engagement by said end face; and means for shifting said sleeve relative to said guide, said shifting means comprising fluid-operated means for displacing said sleeve in one of two directions including a first direction toward and a second direction away from said second conical face, and means for biasing said sleeve in the other of said first and second directions, said fluid-operated means comprising a cylinder and a diaphragm piston installed in said cylinder and operatively connected with said guide, said biasing means comprising a first resilient element reacting against said guide and bearing against said piston and a second resilient element reacting against a support and bearing against said sleeve.

15. The apparatus of claim 14, wherein said guide has an external shoulder and said first resilient element reacts against said shoulder.

16. The apparatus of claim 14, wherein said first resilient element bears against said piston with a first force and said second resilient element bears against said sleeve with a weaker second force.

17. The apparatus of claim 14, wherein one of said resilient elements comprises at least one dished spring and the other of said resilient elements comprises at least one coil spring.

* * * * *